Sept. 24, 1963
J. L. HIRONS
3,104,499
MACHINE FOR SANDBLASTING
Filed June 8, 1962
2 Sheets-Sheet 1
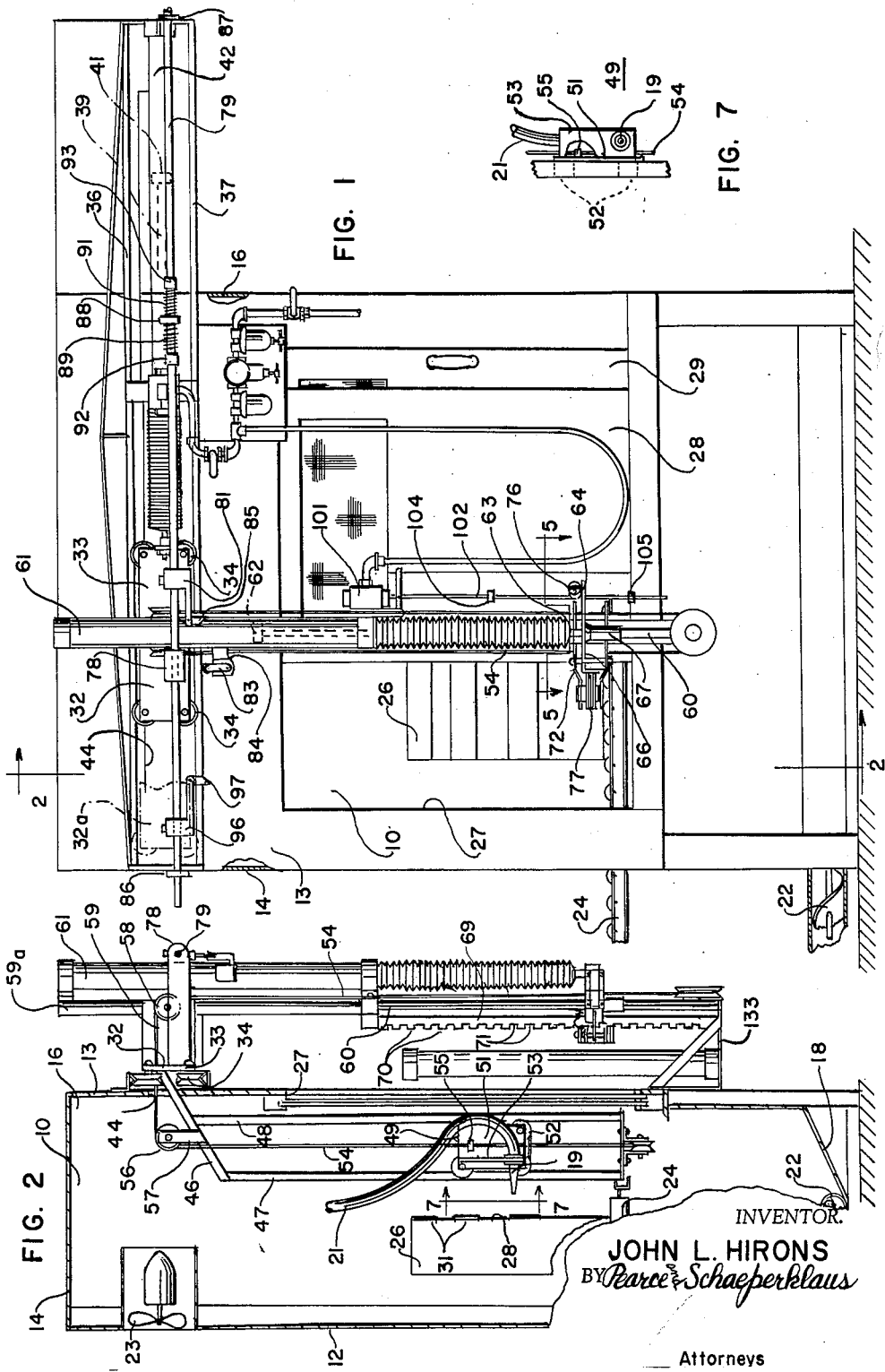
INVENTOR.
JOHN L. HIRONS
BY Pearce & Schaeperklaus
Attorneys Sept. 24, 1963  J. L. HIRONS  3,104,499
MACHINE FOR SANDBLASTING
Filed June 8, 1962  2 Sheets-Sheet 2
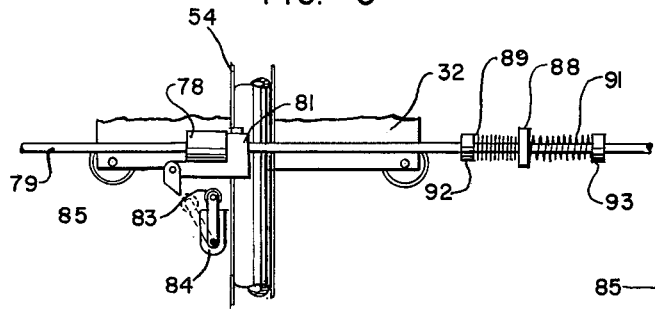
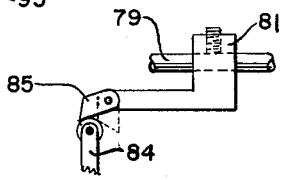
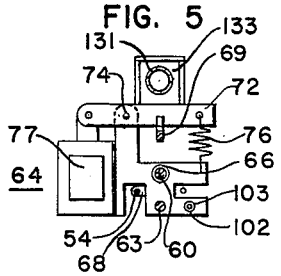
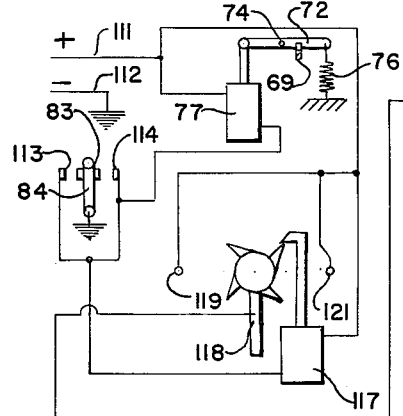
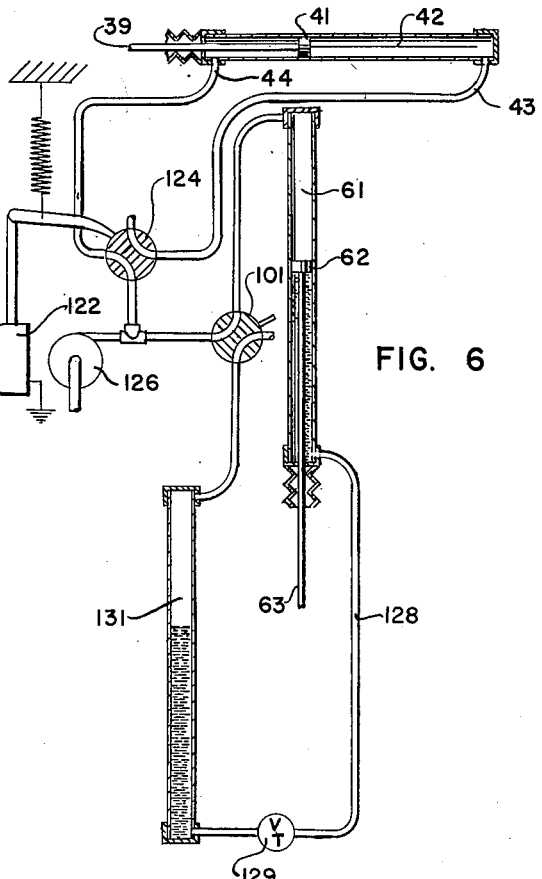
INVENTOR.
JOHN L. HIRONS
BY Pearce & Schaeperklaus
Attorneys

United States Patent Office 3,104,499
Patented Sept. 24, 1963

3,104,499
MACHINE FOR SANDBLASTING
John L. Hirons, % Hirons Memorial Works, 1 mile north
on U.S. 68, Mount Orab, Ohio
Filed June 8, 1962, Ser. No. 201,030
4 Claims. (Cl. 51—8)

This invention relates to a device for guiding a nozzle as the nozzle sweeps across a surface. More particularly, this invention relates to a device for supporting and guiding a nozzle for sandblasting surfaces such as faces of decorative and memorial stones and the like.

An object of this invention is to provide a support for a sandblast nozzle which automatically moves the nozzle across the face of the stone in a regular pattern so that the face of the stone is uniformly sandblasted.

A further object of this invention is to provide a support of this type which progresses across the face of the stone in a series of horizontal lines in order to uniformly sandblast horizontal lines of indicia or the like on the stone.

A further object of this invention is to provide a device of this type in which the sandblast nozzle is carried by a first or main carriage which moves back and forth and a second carriage, mounted on the first carriage, the second carriage moving up and down thereon, the first carriage being moved back and forth by a fluid-actuated cylinder and the second carriage being moved up and down by a second fluid-actuated cylinder and in which means is provided for controlling up and down movement of the second carriage in a series of steps of predetermined length.

A further object of this invention is to provide a device of this type in which the second carriage is moved up and down by the second fluid-actuated cylinder with fluid flow to and from the second fluid-actuated cylinder being controlled by a throttling means which controls the speed of up and down movement.

The above and other objects and features of the invention will be apparent to those skilled in the art to which this invention pertains from the following detailed description, and the drawings, in which like reference characters indicate like parts.

In the drawings:

FIG. 1 is a view in front elevation of a sandblasting machine constructed in accordance with an embodiment of this invention, parts being broken away to disclose interior structure, a main carriage being shown in an alternate position in dot-dash lines;

FIG. 2 is a view in section taken on the line 2—2 in FIG. 1;

FIG. 3 is a fragmentary, partly schematic view showing the main carriage in another position and showing controls actuated thereby;

FIG. 4 is an enlarged fragmentary view showing one of the controls, the control being shown in the position assumed as the carriage starts its movement to the left, a switch actuator thereof being shown in normal position in dot-dash lines;

FIG. 5 is a view in section taken on the line 5—5 in FIG. 1;

FIG. 6 is a somewhat schematic view showing controls and an electric circuit for the machine;

FIG. 7 is a fragmentary view taken in the direction of the arrows 7—7 in FIG. 2; and FIG. 8 is a view in front elevation of a stone, the path of a sandblasting nozzle being shown in dot-dash lines.

In the following detailed description, and the drawings, like reference characters indicate like parts.

In FIGS. 1 and 2 is shown a sandblasting device constructed in accordance with an embodiment of this invention. The device includes an enclosed room 10 having a rear wall 12, a front wall 13, end walls 14 and 16 (FIG. 1), and a ceiling 17 (FIG. 2). A trough 18 in the lower portion of the room 10 receives sand (not shown). The sand is introduced through a nozzle 19 supplied by a hose 21. Sand received in the trough 18 is removed by a screw conveyor 22. An exhaust blower 23 (FIG. 2) removes fine particles which fail to settle.

A conveyor 24 inside the room 10 can support a stone 26. An opening 27 in the front wall 13 permits access to a front face 28 of the stone 26. Sliding doors 28 and 29 can close the opening 27.

In sandblasting indicia or the like on the face of the stone 26, strips or pieces of rubber 31 or the like are adhesively attached to the front face 28 of the stone. Then the nozzle 19 is moved across the face of the stone to sandblast areas of the face of the stone not protected by the strips 31.

The nozzle 19 and apparatus associated therewith are supported by a first or main carriage 32. The main carriage 32 includes a plate 33 and wheels 34 mounted thereon. The wheels 34 run on horizontal tracks 36 and 37 mounted on the front wall 13 so that the main conveyor 32 can move to the left or right from the central position shown in full lines to a position 32a shown in dot-dash lines to the left of the central position and to a similar position (not shown) to the right of the central position. A piston rod 39 is attached to the main carriage 32. The piston rod 39 carries a piston 41 which reciprocates in a cylinder 42. When a fluid such as compressed air is introduced into the right-hand end of the cylinder 42 through an inlet 43 (FIG. 6) the piston 41 and the piston rod 39 can move to the left, and when fluid is introduced into the left-hand end of the cylinder 42 through an inlet 44, the piston 41 and the piston rod 39 can move to advance the conveyor 32 to the left or right.

A slot 44 in the front wall 13 receives a frame bar 46 which is mounted on the main carriage 32 and extends into the interior of the room 10. The frame bar 46 carries upright tracks 47 and 48. A second or inner carriage 49 runs on the upright tracks 47 and 48. The inner carriage includes a body 51 and wheels 52. The wheels 52 travel on the upright tracks 47 and 48. The nozzle 19 is mounted on a frame flange 53 which, in turn, is mounted on the body 51. A cable 54 is attached to the body 51 by means of a clamp 55. The cable 54 supports the inner carriage 49 and extends upwardly therefrom over a pulley 56 rotatably mounted on an upright arm 57 mounted on the frame bar 46, through the slot 44, and over a pulley 58 and downwardly therefrom. The pulley 58 is rotatably mounted on a plate 59 attached to the body of the main carriage 32. The plate 59 supports an upright member 59a and a frame bar 60 mounted at the lower end of the upright frame member 59a. The upright frame member 59a and the frame bar 60 move with the main carriage 32. An upright cylinder 61 is attached to the upright frame member 59a. A piston 62 reciprocates up and down inside the cylinder 61. A piston rod 63 attached to the piston 62 is attached to a sliding assembly 64. The sliding assembly 64 includes the plate 66 mounted on a sleeve 67. The sleeve 67 is slideably mounted on the frame bar 60 for up and down sliding thereon. The cable 54 is attached to the plate 66 as shown in FIG. 5, by a clamp 68 so that, as the plate 66 goes up and down, the nozzle 19 goes down and up. An upright stop bar 69 is attached to the upright frame bar 60 in closely spaced parallelism therewith. The stop bar 69 has a plurality of equally spaced teeth 70 thereon spaced by slots 71. A stop lever 72 can be received in the slots, as shown most clearly in FIG. 5, to stop up and down movement of the plate 66 at selected positions. The stop lever 72 is pivotally mounted on the plate 66 upon a pivot pin 74. A tension spring 76 urges the stop lever 72 into engagement with the stop bar 69. When a solenoid 77 is energized, the stop lever 72 is swung counter-clockwise as shown in FIG. 5 to release the stop lever 72 from the stop bar 69.

When the main carriage approaches the limit of its travel to the right, as shown in FIGS. 1 and 3, a sleeve 78, which is slidably mounted on a horizontal control rod 79, approaches a stop member 81 mounted on the control rod. The sleeve 78 is part of a control bar 82 attached to the body 33 of the main carriage 32. As the sleeve 78 approaches the stop member 81, a switch arm 83 of a switch 84 mounted on the main carriage 32 comes into engagement with a switch actuator 85 mounted on the stop member 81 to swing the switch arm 83 to the dot-dash line position of FIG. 3 to actuate the switch 84. As the carriage moves further to the right, as shown in FIG. 3, the sleeve 78 engages the stop member 81. As already indicated, the stop member 81 is mounted on the horizontal control bar 79. The horizontal control bar 79 is slidably mounted in supports 86 and 87 (FIG. 1) for limited movement to the right and to the left. A stationary ring 88, in which the horizontal control bar 79 is slidably mounted, engages compression springs 80 and 91. Collars 92 and 93 mounted on the horizontal control bar 79 also engage the springs 89 and 91, respectively, so that the horizontal control rod is resiliently urged to the central position shown in FIG. 1. As the sleeve 78 engages the stop member 81, the stop member 81 is advanced to the right, as shown in FIG. 3, with the control bar 79 to compress the spring 89 against the stationary ring 88. Spring pressure resists further advance of the main carriage 32 and stops motion of the main carriage and reverses the direction of motion thereof. As the main carriage starts back to the left, the switch arm 83 is urged to upright position by spring means (not shown) and swings the switch actuator 85 upwardly out of the way, to the full line position of FIG. 4 so that the switch is not actuated again as the main carriage starts its return travel. In a similar manner, the switch 84 is operated when the main carriage 32 reaches the left-hand end of its travel and the direction of advance is reversed by a stop member 96, mounted on the horizontal control rod 79, and switch actuator 97 mounted thereon. When the sleeve 78 engages the stop member 96, the spring 91 is compressed to cause reversal of progress of the main carriage 32 to start the main carriage to the right as shown in FIG. 1.

Reversal of the direction of up and down movement of the plate 66 is effected by a valve 101 and a valve operating rod 102. The rod 102 extends through an opening 103 (FIG. 5) in the plate 66. Collars 104 and 105 (FIG. 1) mounted on the rod 102 are engaged by the plate 66 at the upper and lower limits, respectively, of the movement of the plate 66.

The operation of the machine can be most clearly understood by reference to FIG. 6 which shows fluid and electrical connections thereof. In FIG. 6 electric line leads are indicated at 111 and 112, respectively, the line lead 112 being connected to ground. Each time the switch 83 is actuated, the solenoid 77 is energized by a circuit through the line lead 111, the coil of the solenoid 77, one or the other of stationary contacts 113 and 114 of the switch 84, movable contacts thereof, to ground. Each time the switch 84 is actuated, a solenoid 117 is energized. The solenoid 117 actuates a switch arm 118 to swing the switch arm 118 a quarter turn each time the solenoid 117 is energized. Stationary contacts 119 and 121, which are engageable by the switch arm 118, are connected to a valve operating solenoid 122. When the switch arm 118 is in the position shown in FIG. 6, the solenoid 122 is de-energized. When the switch arm 118 is advanced a quarter turn, one of the stationary contacts 119 and 121 is engaged by the switch arm 118 to energize the valve operating solenoid 122. The valve operating solenoid 122 controls a valve 124. The valve 124, in turn, controls operation of the horizontal cylinder 42. Fluid under pressure is supplied by an appropriate compressor 126. When the valve 124 is in the FIG. 6 position, fluid under pressure is introduced into the left-hand end of the cylinder 42 and drives the piston 41 and the piston rod 39 to the right to move the main carriage to the right. When the valve 124 moves to its other position (not shown), fluid under pressure is introduced into the right-hand end of the horizontal cylinder 42 to drive the piston 41, the piston rod 39 and the main carriage to the left. Each time one of these stationary switch contacts 113 and 114 is engaged by the switch arm 83, the direction of advance of the main carriage is reversed. In addition, each time one of the contacts 113 and 114 is engaged by the switch arm 83, the solenoid 77 is energized to cause the stop lever 72 to swing on its pivot 74 to release the stop lever 72 from the teeth of the stop bar 69 and the sliding assembly 64 can advance as the piston 62 and the piston rod 63 are advanced by pressure from the compressor 126 and the valve 101. When the valve 101 is in the FIG. 6 position, the piston 62 and the piston rod 63 move downwardly each time the solenoid 77 is energized. As the piston 62 moves downwardly, a liquid inside the cylinder 61 below the piston 62 is directed through a line 128 and a throttle valve 129 to an upright cylinder 131. As shown in FIG. 2, the cylinder 131 is mounted on a platform 133 which is attached to the lower end of the frame bar 60. The throttle valve 129 can be an adjustable throttle valve and is preferably set at a sufficiently small opening that the sliding assembly 64 move only part of the way from one of the slots 71 in the stop bar 69 to the next slot before the solenoid 77 is released to permit the stop lever 72 to return into engagement with teeth of the stop bar. Thus, each time the main carriage reaches, one end of its travel, the sliding assembly 64 advances one tooth of the stop bar 69. When the sliding assembly 64 reaches its lowermost position, the valve 101 is moved to its other position (not shown), and pressure from the compressor 126 (FIG. 6) is introduced into the top of the upright cylinder 131 to drive the liquid downwardly therein through the throttle valve 129 and the line 128 to the cylinder 61 to advance the piston 62 and the piston rod 63 upwardly.

As the device operates, the sandblasting nozzle 129 is advanced back and forth across the face of the stone 26 in a path as indicated in dot-dash lines in FIG. 8 with each path being along a horizontal line so that each path follows the lines of indicia on the stone to give a regular path or pattern of sandblasting.

The device illustrated in the drawings and described above, is subject to structural modification without departing from the spirit and scope of the appended claims.

Having described my invention, what I claim as new and desire to secure by Letters Patent, is:

1. A machine for sandblasting indicia on surface of an object which comprises an enclosed chamber, means for supporting the object in the chamber, a horizontal main track on a wall of the chamber, a main carriage traveling on said main track, a frame bar mounted on the main carriage and extending inwardly and outwardly of the wall of the chamber, the frame bar extending through a horizontal slot in the wall adjacent the main track, an upright inner track mounted on the frame bar inside the chamber, a second carriage traveling on the upright track, a sandblast nozzle carried by the second carriage for traveling transversely of the surface and directing a sandblast toward said surface, an upright outer assembly mounted on the frame bar externally of the wall, an upright outer track, a counterweight member mounted for up and down movement on the upright outer track, means connecting the second carriage with the counterweight member for up and down movement in unison in opposite directions, means for driving the main carriage back and forth between predetermined limits of movement, switch means actuated by the main carriage at each end of the travel thereof, the upright assembly comprising means for driving the counterweight member up and down to move the nozzle down and up, and an upright stop bar having a plurality of equally spaced teeth thereon, a stop lever mounted on the counterweight member and engageable with the teeth, and means actuated by the switch for releasing the stop lever from the teeth when the main carriage reaches an end of its travel, whereby the nozzle moves back and forth at a predetermined speed and advances one tooth of the stop bar each time the main carriage reaches an end of its travel.

2. A machine for sandblasting indicia on a surface of an object which comprises an enclosed chamber, means for supporting the object in the chamber, a horizontal main track on a wall of the chamber, a main carriage traveling on said horizontal track, a frame bar mounted on the main carriage and extending inwardly and outwardly of the wall of the chamber, the frame bar extending through a horizontal slot in the wall adjacent the main track, an upright inner track mounted on the frame bar inside the chamber, a second carriage traveling on the upright track, a sandblast nozzle carried by the second carriage for traveling transversely of the surface and directing a sandblast toward said surface, an upright outer assembly mounted on the frame bar externally of the wall, an upright outer track, a counterweight member mounted for up and down movement on the upright outer track, means connecting the second carriage with the counterweight member for up and down movement in unison in opposite directions, means for driving the main carriage back and forth between predetermined limits of movement and at a predetermined rate, switch means actuated by the main carriage at each end of the travel thereof, the upright assembly comprising means for driving the counterweight member up and down to move the nozzle down and up, and an upright stop bar having a plurality of equally spaced teeth thereon, a stop lever mounted on the counterweight member and engageable with the teeth, means actuated by the switch means for reversing the direction of movement of the main carriage when the main carriage reaches each limit of movement thereof, means actuated by the switch means for releasing the stop lever from the teeth when the main carriage reaches each limit of movement thereof, and means for controlling the rate of movement of the counterweight member and of the second carriage so that the switch is released before the movement from one tooth to the next tooth, whereby the nozzle moves back and forth at a predetermined speed and advances one tooth of the stop bar each time the main carriage reaches an end of its travel.

3. A machine for sandblasting indicia on a surface of an object which comprises an enclosed chamber, means for supporting the object in the chamber, a main track on a wall of the chamber, a main carriage traveling on said main track, a frame bar mounted on the main carriage and extending inwardly of the wall of the chamber, an inner track mounted on the frame bar inside the chamber and extending transversely of the main track, a second carriage traveling on the inner track, a sandblast nozzle carried by the second carriage for traveling transversely of the surface and directing a sandblast toward said surface, means for driving the main carriage back and forth between predetermined limits of movement, switch means actuated by the main carriage at each end of the travel thereof, means for driving the second carriage back and forth along the second track to move the nozzle across the surface, a stop bar mounted on the frame bar and having a plurality of equally spaced teeth thereon, a stop lever connected to the second carriage and engageable with the teeth, and means actuated by the switch for releasing the stop lever from the teeth when the main carriage reaches an end of its travel, whereby the nozzle moves back and forth at a predetermined speed and advances one tooth of the stop bar each time the main carriage reaches an end of its travel.

4. A machine for sandblasting indicia on a surface of an object which comprises a horizontal track, a main carriage traveling on said horizontal track, a first upright track mounted on the main carriage, a second carriage mounted on the upright track, a sandblast nozzle carried by the second carriage for traveling transversely of the surface and directing a sandblast toward the surface, a second upright track mounted on the main carriage, a counterweight member mounted for up and down movement on the second upright track, means connecting the second carriage with the counterweight member for up and down movement in unison in opposite directions, means for driving the main carriage back and forth between predetermined limits of movement, switch means actuated by the main carriage at each end of the travel thereof, means mounted on the main carriage for driving the counterweight member up and down to move the nozzle down and up, and an upright stop bar having a plurality of equally spaced teeth thereon, a stop lever mounted on the counterweight member and engageable with the teeth, and means actuated by the switch for releasing the stop lever from the teeth when the main carriage reaches an end of its travel, whereby the nozzle moves back and forth at a predetermined speed and advances one tooth of the stop bar each time the main carriage reaches an end of its travel.

References Cited in the file of this patent
UNITED STATES PATENTS

| | | |
|---|---|---|
| 1,849,384 | Ruemelin | Mar. 15, 1932 |
| 1,882,541 | Billman | Oct. 11, 1932 |
| 1,930,170 | Jones | Oct. 10, 1933 |
| 1,974,470 | Ruemelin | Sept. 25, 1934 |
| 2,063,054 | Rosenberger | Dec. 8, 1936 |
| 2,628,455 | Webster | Feb. 17, 1953 |
| 2,953,876 | Zieber et al. | Sept. 27, 1960 |